(12) United States Patent
Yamasaki et al.

(10) Patent No.: US 10,749,456 B2
(45) Date of Patent: *Aug. 18, 2020

(54) CONTROL DEVICE

(71) Applicant: RENESAS ELECTRONICS CORPORATION, Tokyo (JP)

(72) Inventors: Reiji Yamasaki, Tokyo (JP); Yutaka Ono, Tokyo (JP)

(73) Assignee: RENESAS ELECTRONICS CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/399,253

(22) Filed: Apr. 30, 2019

(65) Prior Publication Data

US 2019/0260318 A1    Aug. 22, 2019

Related U.S. Application Data

(63) Continuation of application No. 15/699,791, filed on Sep. 8, 2017, now Pat. No. 10,320,317.

(30) Foreign Application Priority Data

Sep. 12, 2016   (JP) ................................. 2016-177461

(51) Int. Cl.
*H02P 21/14* (2016.01)
*H02P 21/00* (2016.01)
(Continued)

(52) U.S. Cl.
CPC .............. *H02P 21/14* (2013.01); *G05B 13/02* (2013.01); *H02P 21/0021* (2013.01);
(Continued)

(58) Field of Classification Search
CPC ...... H02P 21/13; H02P 23/12; H02P 21/0007; H02P 23/0009; H02P 21/18
See application file for complete search history.

(56) References Cited

U.S. PATENT DOCUMENTS 6,396,226 B2 * 5/2002 Schmider .................. H02P 6/22
                                                      318/400.11
6,396,229 B1    5/2002 Sakamoto et al.
(Continued)

FOREIGN PATENT DOCUMENTS

JP         08-308286 A    11/1996

OTHER PUBLICATIONS

Takaharu Takeshita et al., "Sensorless Brushless DC Motor Control Method Based on Current Estimation Error", T. IEE Japan, vol. 115-D, No. 4, 1995.
(Continued)

*Primary Examiner* — Bickey Dhakal
(74) *Attorney, Agent, or Firm* — McDermott Will & Emery LLP

(57) ABSTRACT

In a sensorless control of a motor, due to the characteristic of a response frequency, an induced voltage, a magnetic pole position estimation gain, a current control gain, and a speed control gain are closely related. An object of the invention is to enable the induced voltage and the frequency characteristic of a magnetic pole position estimation system to be clearly designed and to theoretically and quantitatively design all of the control gains necessary for the sensorless control so as to solve a problem that a method of designing those parameters cannot be established and the parameters have to be adjusted in a try and error manner. A control device has an estimator estimating an estimation induced voltage and a phase error of a motor by applying an induced-voltage observer and a controller controlling the motor on the basis of the estimation induced voltage and the phase error.

6 Claims, 11 Drawing Sheets

(51) Int. Cl.
  *H02P 25/089* (2016.01)
  *H02P 21/13* (2006.01)
  *H02P 21/18* (2016.01)
  *G05B 13/02* (2006.01)

(52) U.S. Cl.
  CPC .............. *H02P 21/13* (2013.01); *H02P 21/18* (2016.02); *H02P 25/089* (2016.02); *H02P 2203/11* (2013.01)

(56) References Cited

U.S. PATENT DOCUMENTS

| | | |
|---|---|---|
| 9,219,431 B2 | 12/2015 | Hirono |
| 9,971,098 B2 | 5/2018 | Zhang |
| 2011/0221382 A1* | 9/2011 | Hayashi ................. B62D 5/046 318/801 |
| 2014/0210385 A1 | 7/2014 | Kozaki |

OTHER PUBLICATIONS

Non-Final Office Action issued in related parent U.S. Appl. No. 15/699,791, dated Jun. 14, 2018.
Notice of Allowance issued in related parent U.S. Appl. No. 15/699,791, dated Feb. 8, 2019.

\* cited by examiner

CONTROL DEVICE

CROSS-REFERENCE TO RELATED APPLICATIONS

This application is a Continuation of U.S. patent application Ser. No. 15/699,791 filed on Sep. 8, 2017, which claims the benefit of Japanese Patent Application No. 2016-177461 filed on Sep. 12, 2016 including the specification, drawings and abstract are incorporated herein by reference in their entirety.

BACKGROUND

The present invention relates to a control device and relates to, for example, a control device of a motor.

In a brushless DC motor, as one of general control methods, on the basis of a rotating coordinate system in which a rotor magnetic pole direction is defined as a d axis and an axis which is advanced by 90° in the θ positive direction from the d axis is defined as a q axis, a d-axis current is set as 0, and linear control of a q-axis current and a torque is performed.

A technique of computing the rotation position of a rotor in the brushless DC motor on the basis of currents flowing in three-phase coils, not detecting the rotation position by using a sensor, is proposed.

Since the magnetic pole position (the position of the dq axis) of the rotor is unknown in a sensorless control including a method based on a current estimation error, the magnitude and the phase of an induced voltage generated in the motor are estimated and, from them, the magnetic pole position (the position of the dq axis) of the rotor is estimated.

For example, in Japanese Unexamined Patent Application Publication No. Hei 8(1996)-308286, current values Iu and Iv flowing in a stator coil are detected, and the rotation angle is estimated from the detected values. In Non-Patent Literature 1, "Sensorless Brushless DC Motor Control Method Based on Current Estimation Error", Takaharu Takeshita, Naofumi Nomura, and Nobuyuki Matsui, T. IEE Japan, Vol. 115-D, No. 4, 1995, a sensorless brushless DC motor control based on a current estimation error is described.

SUMMARY

Generally, in sensorless control of a motor based on a current estimation error, the induced voltage and the frequency characteristic of the magnetic pole position estimation system depend on the speed of the motor. Consequently, when the rotation of the motor becomes low speed, a convergence gain of an estimation system becomes small, and the response frequency becomes lower.

In the sensorless control of the motor, to perform current control and computation of estimation of the induced voltage and the magnetic pole position in a stable control axis, induced-voltage estimation response time has to be equal to or longer than current response time of a control system.

To maintain the relation, as the rotation of the motor decreases, the response frequency of current has to be decreased. Further, when the response frequency of current is decreased, in some cases, the response frequency of speed has to be decreased.

As described above, in the motor sensorless control, due to the characteristic of a response frequency, an induced voltage, a magnetic pole position estimation gain, a current control gain, and a speed control gain are closely related. However, there is a problem such that a method of designing those parameters cannot be established and the parameters have to be adjusted in a try and error manner.

The other problems and novel features will become apparent from the description of the specification and the appended drawings.

According to an embodiment, by using an induced-voltage observer, an induced voltage is estimated, and all of control gains are unconditionally determined.

According to the embodiment, the induced voltage and the frequency characteristic of a magnetic pole position estimation system can be clearly designed, and all of control gains necessary for sensorless control can be designed theoretically and quantitatively.

DETAILED DESCRIPTION

Figure 1:
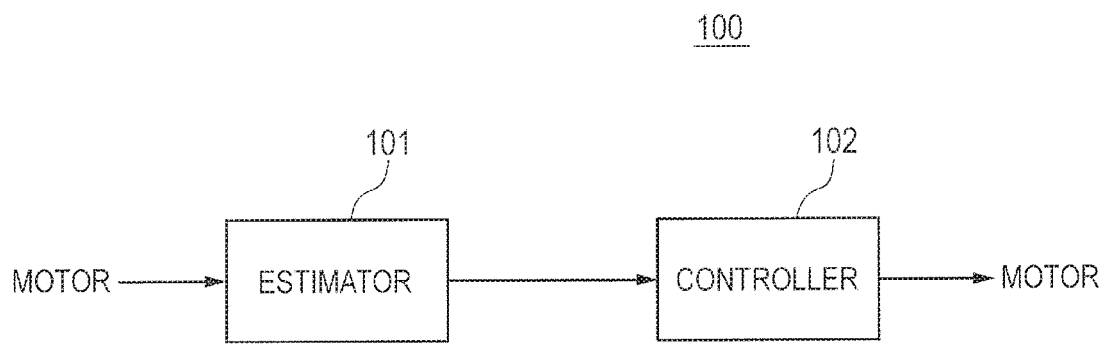
FIG. 1 is a block diagram illustrating the configuration of a control device according to outline of an embodiment.

For clarification of description, omission and simplification are properly made in the following description and drawings. Each of elements illustrated in the drawings as function blocks performing various processes can be constructed by a CPU, a memory, and other circuits as hardware, and is realized by a program loaded to a memory as software. Therefore, a person skilled in the art understands that the function blocks can be realized in various forms of only hardware, only software, or combination of the hardware and software, and the invention is not limited to any of the forms. In the drawings, the same reference numeral is designated to the same element and repetitive description is omitted as necessary.

Outline of Embodiments

FIG. 1 is a block diagram illustrating the configuration of a control device according to outline of an embodiment. In FIG. 1, a control device 100 has an estimator 101 and a controller 102. The control device 100 controls a motor.

The estimator 101 estimates an estimated induction voltage and a phase error of a motor from a target voltage of the motor, a current value of the motor, and a magnetic pole position (rotation angle) of a rotor of the motor estimated in the past by applying an induced-voltage observer.

The controller 102 controls the motor on the basis of the estimated induction voltage and the phase error.

As described above, with the control device related to the outline of the embodiment, by estimating the induced voltage by using the induced-voltage observer and unconditionally determining all of control gains, the induced voltage and the frequency characteristic of a magnetic pole position estimation system can be clearly designed, and all of control gains necessary for sensorless control can be designed theoretically and quantitatively.

First Embodiment

In a first embodiment, the detailed configuration of the control device 100 described in the outline of embodiments and a control device of a motor using the control device 100 will be described.

Figure 2:
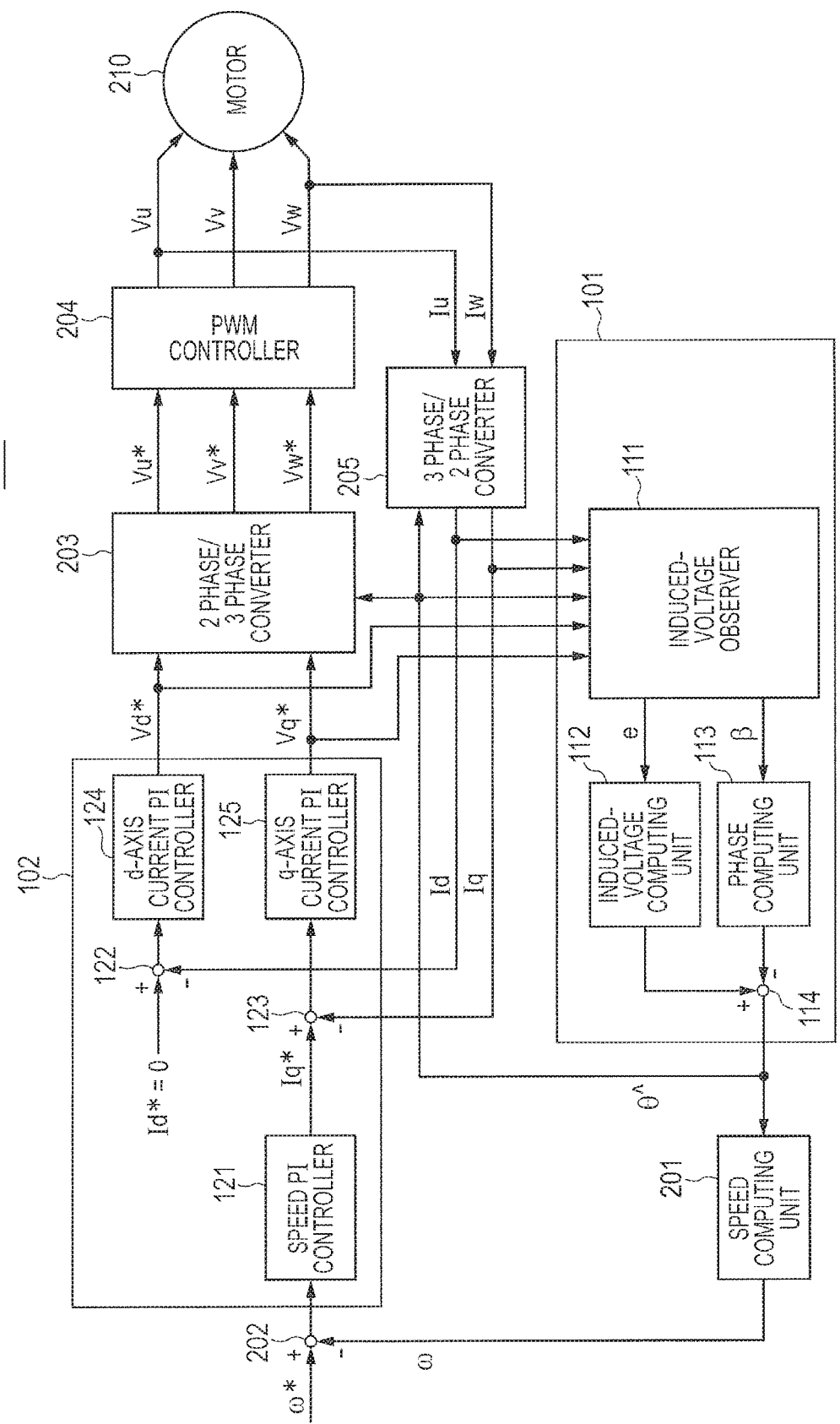
FIG. 2 is a block diagram illustrating the configuration of a control device according to a first embodiment.

First, the functions of components of the control device according to the first embodiment will be described. FIG. 2 is a block diagram illustrating the configuration of a control device according to the first embodiment. In FIG. 2, a control device 200 has the estimator 101, the controller 102, a speed computing unit 201, a subtracter 202, a 2 phase/3 phase converter 203, a PWM controller 204, and a 3 phase/2 phase converter 205. The control device 200 controls the rotation speed of a motor 210. For example, the estimator 101, the controller 102, the speed computing unit 201, and the subtracter 202 may be constructed by a processor or a semiconductor device made by an ASIC (Application Specific Integrated Circuit) or a CPU (Central Processing Unit) and a memory.

The estimator 101 estimates the present rotation angle of the rotor of the motor 210 on the basis of a U-phase current value Iu, a V-phase current value Iv, and the rotation angle of the rotor of the motor 210 in the past (for example, one sample before). The estimator 101 outputs the estimated rotation angle to the speed computing unit 201, the 2 phase/3 phase converter 203, and the 3 phase/2 phase converter 205. The detailed configuration and operation of the estimator 101 will be described later.

The controller 102 computes target voltages $V_d$ and $V_q$ on the dq coordinate axis on the basis of the deviation between a current target value $I_q^*$ determined from the difference between a target rotation speed and the rotation speed obtained by the speed computing unit 201 and a 3-phase current actually flowing in the motor 210. The controller 102 outputs the computation result to the estimator 101 and the 2 phase/3 phase converter 203.

The speed computing unit 201 calculates the rotation speed on the basis of the rotation angle estimated by the estimator 101. The speed computing unit 201 outputs the obtained rotation speed to the subtracter 202.

The subtracter 202 subtracts the rotation speed obtained by the speed computing unit 201 from the target rotation speed instructed from the outside. The subtracter 202 outputs the subtraction result to the controller 102.

The 2 phase/3 phase converter 203 converts the target voltages $V_d$ and $V_q$ instructed from the controller 102 to target voltages Vu*, Vv*, and Vw* of actual three phases. The 2 phase/3 phase converter 203 outputs the target voltages Vu*, Vv*, and Vw* of actual three phases to the PWM controller 204.

The PWM controller 204 determines a duty ratio which realizes the target voltages Vu*, Vv*, and Vw* of three phases by on/off of a not-illustrated DC power supply. The PWM controller 204 drives the motor 210 by a pulse wave of the duty ratio. For example, the PWM controller 204 has therein an inverter, controls six switching elements, and controls voltages applied to coils of three phases in the motor 210. The inverter has a current sensor detecting currents of the U phase and the V phase, and a U-phase current value Iu and a V-phase current value Iv are detected. The inverter may be provided on the inside or the outside of the PWM controller 204.

The 3 phase/2 phase converter 205 calculates the current values $I_d$ and $I_q$ on the dq coordinate axis from the rotation angle estimated by the estimator 101 and the current values Iu and Iv of the phases detected by the PWM controller 204. Then, the 3 phase/2 phase converter 205 outputs the current values $I_d$ and $I_q$ to the estimator 101 and the controller 102.

Next, the internal configuration of the estimator 101 will be described. In FIG. 2, the estimator 101 has an induced-voltage observer 111, an induced-voltage computing unit 112, a phase computing unit 113, and a subtracter 114.

The induced-voltage observer 111 estimates magnitude "e" of an estimation induced voltage and a phase error β on the basis of the target voltages $V_d$ and $V_q$ on the dq coordinate axis, the current values $I_d$ and $I_q$ on the dq coordinate axis, and the rotation angle of the rotor of the motor 210 estimated in the past. The induced-voltage observer 111 outputs the magnitude "e" of the estimation induced voltage to the induced-voltage computing unit 112. The induced-voltage observer 111 outputs the phase error β to the phase computing unit 113.

The induced-voltage computing unit 112 performs computation of dividing the magnitude of the induced voltage by an induced-voltage coefficient. The induced-voltage computing unit 112 outputs the computation result to the subtracter 114.

The phase computing unit 113 performs computation of integration of multiplying the phase error β by an error angle integration gain ωβ. The phase computing unit 113 outputs the computation result to the subtracter 114.

The subtracter 114 subtracts the computation result of the phase computing unit 113 from the computation result of the induced-voltage computing unit 112 to obtain a magnetic pole position estimation value θ^. The subtracter 114 outputs the magnetic pole position estimation value θ^ to the induced-voltage observer 111, the speed computing unit 201, the 2 phase/3 phase converter 203, and the 3 phase/2 phase converter 205.

As described above, in the estimator 101, the magnetic pole position estimation value θ^ is controlled by adding phase information calculated from the amplitude "e" and multiplying the phase error β with the error angle integration gain ωβ so that β becomes zero (β=0).

The internal configuration of the controller 102 will now be described. In FIG. 2, the controller 102 has a speed PI controller 121, subtracters 122 and 123, a d-axis current PI controller 124, and a q-axis current PI controller 125.

The speed PI controller 121 determines a current target value $I_q^*$ determined from the difference between the target rotation speed and the rotation speed obtained by the speed computing unit 201. The speed PI controller 121 outputs the current target value $I_q^*$ to the subtracter 123.

The subtracter 122 subtracts the current value $I_d$ output from the 3 phase/2 phase converter 205 from the target value $I_d^*$ (=0). The subtraction result is output to the d-axis current PI controller 124.

The subtracter 123 subtracts the current value $I_q$ output from the 3 phase/2 phase converter 205 from the target value $I_q^*$. The subtraction result is output to the q-axis current PI controller 125.

The d-axis current PI controller 124 determines a target voltage $V_d$ from the difference between the target value $I_d^*$ and the current value $I_d$. The d-axis current PI controller 124 outputs the target voltage $V_d$ to the 2 phase/3 phase converter 203.

The q-axis current PI controller 125 determines a target voltage $V_q$ from the difference between the target value $I_q^*$ and the current value $I_q$. The q-axis current PI controller 125 outputs the target voltage $V_q$ to the 2 phase/3 phase converter 203.

As described above, in the controller 102, on the basis of the deviations between the current target value $I_q^*$ and the current values $I_d$ and $I_q$ on the dq coordinate axis obtained by converting the currents of three phases actually flowing in the motor 210, the target voltages $V_d$ and $V_q$ on the dq coordinate axis are computed.

Figure 3:
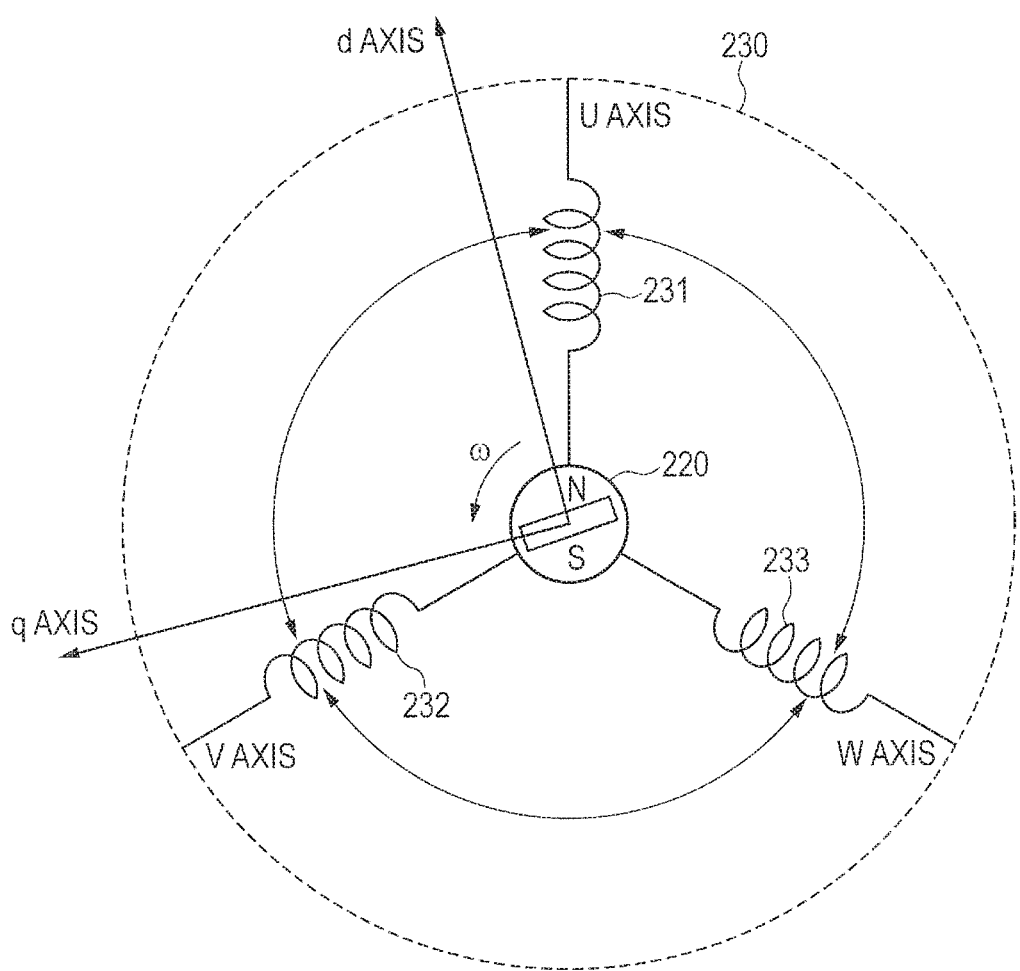
FIG. 3 is a diagram for explaining the configuration of a motor and a coordinate system.

Next, the motor 210 will be described. FIG. 3 is a diagram for explaining the configuration of the motor and a coordinate system. In this embodiment, the motor 210 is a three-phase brushless motor. As illustrated in FIG. 3, the motor 210 has a rotor 220 as a field and stator windings 231, 232, and 233 of a U phase, a V phase, and a W phase disposed in a stator 230 opposed to the rotor 220. The motor 210 may be of an inner rotor type in which a stator is disposed on the outside of a rotor so as to face the rotor or an outer rotor type in which a stator is disposed on the inside of a cylindrical rotor so as to face the rotor.

Three-phase fixed coordinates (UVW coordinate system) having a U axis, a V axis, and a W axis in the directions of the stator windings 231, 232, and 233 of the respective phases are defined. A two-phase rotation coordinate system (the dq coordinate system or actual rotation coordinate system) in which the d axis (magnetic pole axis) is set in the magnetic pole direction of the rotor 220 and the q axis (torque axis) is set in a direction orthogonal to the d axis in the rotation plane of the rotor 220 is also defined. The dq coordinate system is a rotation coordinate system which rotates together with the rotor 220. In the dq coordinate system, only the q-axis current contributes to torque generation of the rotor 220. Consequently, it is sufficient to set the d-axis current to zero and control the q-axis current in accordance with a desired torque. The rotation angle (rotor angle) θ of the rotor 220 is the rotation angle of the d axis with respect to the U axis. The dq coordinate system is an actual rotation coordinate system according to the rotor angle θ. By using the rotor angle θ, the coordinate conversion can be performed between the UVW coordinate system and the dq coordinate system.

In the first embodiment, the control device 100 controls the motor 210 as the above-described three-phase brushless motor. Next, the operation of the control device 100 of the first embodiment will be described.

1. Estimation of Induced Voltage and Phase Using Induced-Voltage Observer

Figure 4:
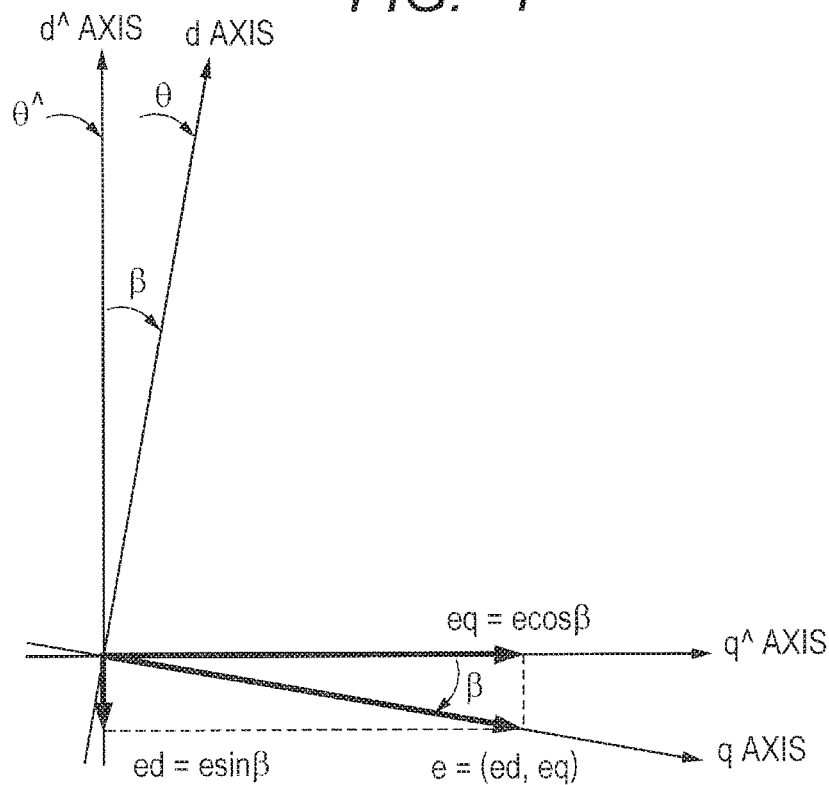
FIG. 4 is a diagram for explaining true coordinate axes desired to be estimated and coordinate axes used for control.

By using FIG. 4, estimation of the induced voltage and the phase using the induced-voltage observer will be described. FIG. 4 is a diagram for explaining true coordinate axes desired to be estimated and coordinate axes used for control. In FIG. 4, the d axis is a true d axis desired to be estimated and the d^ axis is a d axis used for control. Similarly, in FIG. 4, the q axis is a true q axis desired to be estimated, and the q^ axis is a q axis used for control. In FIG. 4, θ indicates a true magnetic pole position, and θ^ denotes a magnetic pole estimation position. β denotes an error angle between the d axis and the d^ axis, and an error angle between the q axis and the q^ axis. "e" indicates an induced voltage appeared on the d^q^ axis.

From FIG. 4, voltage equations on the dq control axis are written as the following formulae (1) and (2).

$$v^*_d = (R + sL_d)i_d - \omega^* L_q i_q + e_d \qquad (1)$$

$$v^*_q = (R + sL_q)i_q + \omega^* L_d i_d + e_q \qquad (2)$$

In the formulae (1) and (2), $V_d^*$ and $V_q^*$ are instruction voltage values of the d axis and the q axis. R denotes a winding resistance value of the coil of the rotor. "s" denotes a differential operator (Laplace operator). $L_d$ and $L_d$ are inductances in the d axis and the q axis, respectively. $i_d$ and $i_d$ are current values in the d axis and the q axis, respectively. $\omega^*$ denotes target rotation speed. $e_d$ and $e_q$ denote estimation induced voltage values in the d axis and the q axis, respectively.

Now, $-\omega^* L_q i_q$ and $-\omega^* L_d i_d$ are regarded as disturbances and set as $-d_d$ and $-d_q$.

$$v^*_d = (R + sL_d)i_d - d_d \qquad (3)$$

$$v^*_q = (R + sL_q)i_q - d_q \qquad (4)$$

Then, voltage equations become as the above formulae (3) and (4) and equations in which the d axis and the q axis are separated. First, an estimation formula of the d-axis induced voltage is derived. The formula (3) is rewritten to the following formula (5).

$$si_d = \frac{v^*_d}{L_d} - \frac{R}{L_d}i_d + \frac{d_d}{L_d} \qquad (5)$$

On the basis of the formula (5), $i_d$ and d (disturbance) are set as state variables, and a state equation (6) and a formula (7) are set.

$$si_d = -\frac{R}{L_d}i_d + \frac{d}{L_d} + \frac{v^*_d}{L_d} \qquad (6)$$

$$sd = sd_d \qquad (7)$$

When estimation values of $i_d$ and d are set as
$\hat{i}_d$
$\hat{d}$
and
, respectively, estimation state equations on the observer side can be written as the following formulae (8) and (9) by adding terms in which estimation errors are multiplied by estimation gains $K_{Ed1}$ and $K_{Ed2}$.

$$s\hat{i}_d = -\frac{R}{L_d}\hat{i}_d + \frac{\hat{d}}{L_d} + \frac{v^*_d}{L_d} + K_{Ed1}(i_d - \hat{i}_d) \qquad (8)$$

$$s\hat{d} = K_{Ed2}(i_d - \hat{i}_d) \qquad (9)$$

When the formula (9) is substituted into the formula (8),
$\hat{i}_d$
is expressed as the following formula (10).

$$\hat{e_d} = \cfrac{\cfrac{K_{Ed2}}{L_d}}{s^2 + \left(\cfrac{R}{L_d} + K_{Ed1}\right)s + \cfrac{K_{Ed2}}{L_d}} \left\{\left(1 + \cfrac{K_{Ed1}}{K_{Ed2}}L_d s\right)i_d + \cfrac{s}{K_{Ed2}}v_d^*\right\} \quad (10)$$

When the formula (10) is substituted into the formula (9), $\hat{d}$ can be written as the following formula (11).

$$\hat{d} = \widehat{d_d} = \cfrac{\cfrac{K_{Ed2}}{L_d}}{s^2 + \left(\cfrac{R}{L_d} + K_{Ed1}\right)s + \cfrac{K_{Ed2}}{L_d}} \{(L_d s + R)i_d - v_d^*\} \quad (11)$$

Figure 5:
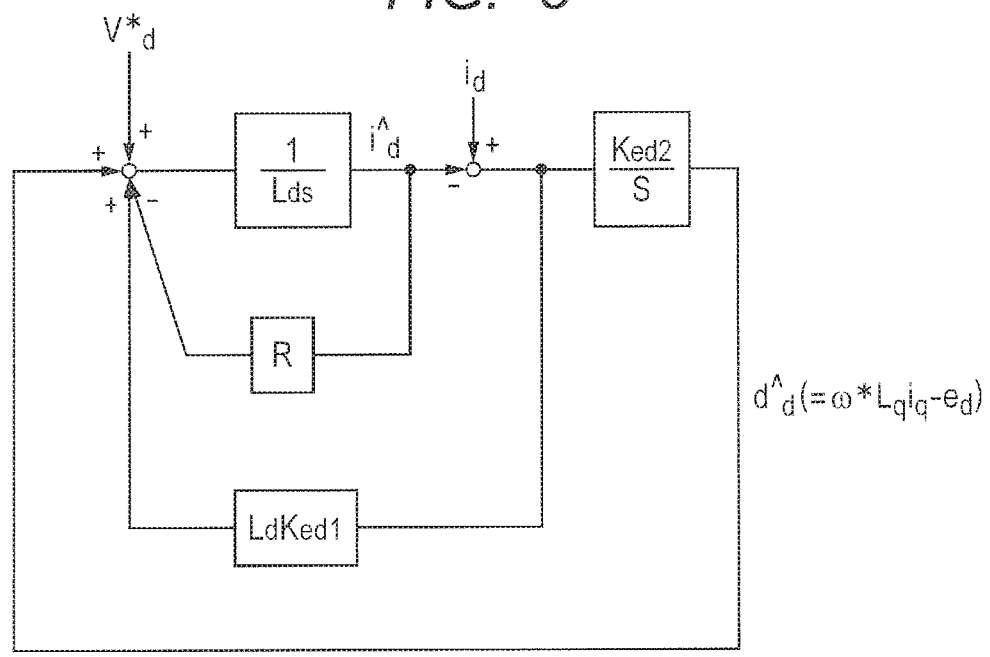
FIG. 5 is a block diagram of a d-axis induced-voltage estimation system.

FIG. 5 is a block diagram of a d-axis induced-voltage estimation system to which the induced-voltage observer is applied. Concretely, FIG. 5 is a block diagram expressing the formula (11).

Looking at the formulae (10) and (11), $\hat{e_d}$ $\widehat{d_d}$ and become secondary systems of formulae (12) and (13) using $i_d$ and $v_d^*$ as inputs.

$$\omega_{EG} = \sqrt{\cfrac{K_{Ed2}}{L_d}} \quad (12)$$

$$\zeta_{EG} = \cfrac{\cfrac{R}{L_d} + K_{Ed1}}{2\sqrt{\cfrac{K_{Ed2}}{L_d}}} \quad (13)$$

That is, the frequency characteristics of the d-axis induced-voltage estimation system can be designed by a natural frequency $\omega_{EG}$ and a damping factor $\zeta_{EG}$, and estimation gains $K_{Ed1}$ and $K_{Ed2}$ can be written as the following formulae (14) and (15), respectively.

$$K_{Ed1} = 2\zeta_{EG}\omega_{EG} - \cfrac{R}{L_d} \quad (14)$$

$$K_{Ed2} = \omega_{EG}^2 L_d \quad (15)$$

Subsequently, similar calculation is performed also on the q axis. The formula (4) is rewritten as the following formula (16).

$$si_q = \cfrac{v_q^*}{L_q} - \cfrac{R}{L_q}i_q + \cfrac{d_q}{L_q} \quad (16)$$

On the basis of the formula (16), using $i_q$ and d (disturbance) as state variables, state equations (17) and (18) are set.

$$si_q = -\cfrac{R}{L_q}i_q + \cfrac{d_q}{L_q} + \cfrac{v_q^*}{L_q} \quad (17)$$

$$sd = sd_q \quad (18)$$

When estimation values of $i_q$ and d are expressed as $\hat{i_q}$ $\hat{d}$ and, estimation state equations on the observer side can be written as the following formulae (19) and (20) by adding terms in which an estimation error is multiplied by estimation gains $K_{Eq1}$ and $K_{Eq2}$.

$$s\hat{i_q} = -\cfrac{R}{L_q}\hat{i_q} + \cfrac{\hat{d}}{L_q} + \cfrac{v_q^*}{L_q} + K_{Eq1}(i_q - \hat{i_q}) \quad (19)$$

$$s\hat{d} = K_{Eq2}(i_q - \hat{i_q}) \quad (20)$$

When the formula (20) is substituted into the formula (19), $\hat{e_q}$ is expressed as the following formula (21).

$$\hat{e_q} = \cfrac{\cfrac{K_{Eq2}}{L_d}}{s^2 + \left(\cfrac{R}{L_q} + K_{Eq1}\right)s + \cfrac{K_{Eq2}}{L_q}} \left\{\left(1 + \cfrac{K_{Eq1}}{K_{Eq2}}L_q s\right)i_q + \cfrac{s}{K_{Eq2}}v_q^*\right\} \quad (21)$$

When the formula (21) is substituted into the formula (20), $\hat{d}$ can be written as the following formula (22).

$$\hat{d} = \widehat{d_q} = \cfrac{\cfrac{K_{Eq2}}{L_d}}{s^2 + \left(\cfrac{R}{L_q} + K_{Eq1}\right)s + \cfrac{K_{Eq2}}{L_q}} \{(L_q s + R)i_q - v_q^*\} \quad (22)$$

Figure 6:
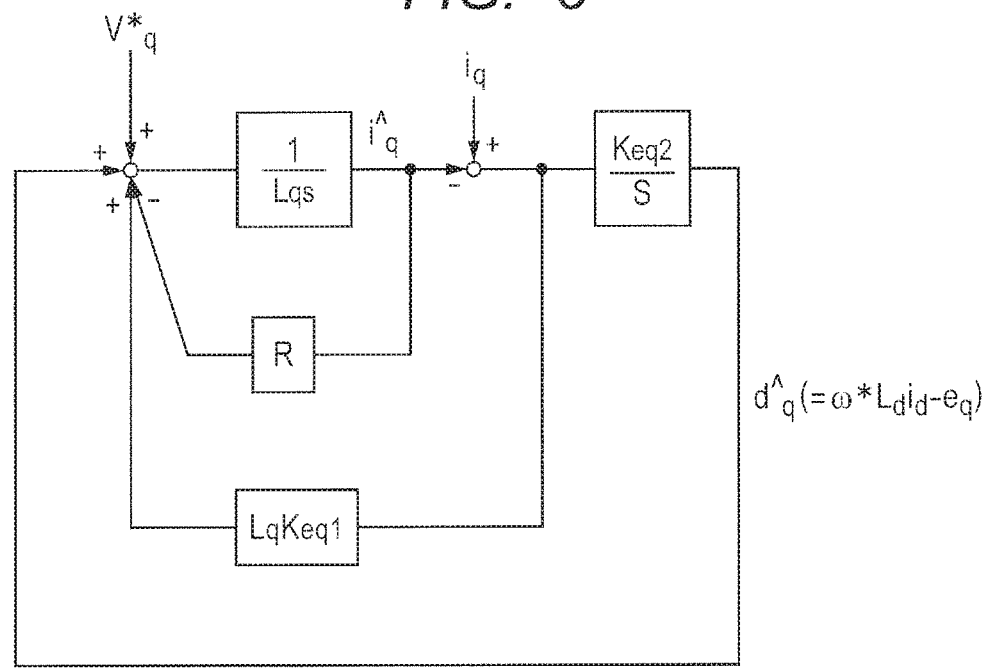
FIG. 6 is a block diagram of a q-axis induced-voltage estimation system.

FIG. 6 is a block diagram of a q-axis induced-voltage estimation system to which the induced-voltage observer is applied. Concretely, FIG. 6 is a block diagram expressing the formula (11).

Looking now at the formulae (21) and (22), $\hat{e_q}$ $\widehat{d_q}$ and become secondary systems of formulae (23) and (24) using $i_q$ and $V_q^*$ as inputs.

$$\omega_{EG} = \sqrt{\cfrac{K_{Eq2}}{L_q}} \quad (23)$$

$$\zeta_{EG} = \cfrac{\cfrac{R}{L_q} + K_{Eq1}}{2\sqrt{\cfrac{K_{Eq2}}{L_q}}} \quad (24)$$

That is, like in the d-axis induced-voltage estimation system, the frequency characteristics of the q-axis induced-voltage estimation system can be also designed by $\omega_{EG}$ and $\zeta_{EG}$, and estimation gains $K_{Eq1}$ and $K_{Eq2}$ can be written as the following formulae (25) and (26), respectively.

$$K_{Eq1} = 2\zeta_{EG}\omega_{EG} - \frac{R}{L_q} \tag{25}$$

$$K_{Eq2} = \omega_{EG}^2 L_q \tag{26}$$

Subsequently, when estimation induced-voltages are calculated from the estimated disturbances $$\widehat{d_d}$$

$$\widehat{d_q}$$

and obtained by the formulae (11) and (22), the following formulae (27) and (28) are derived.

$$e_d = -\widehat{d_d} + \omega^* L_q i_q \tag{27}$$

$$e_q = -\widehat{d_q} - \omega^* L_d i_d \tag{28}$$

Therefore, the magnitude "e" of the estimation induced-voltage and the phase error β are obtained as the following formulae (29) and (30).

$$e = \sqrt{e_d^2 + e_q^2} \tag{29}$$

$$\beta = \operatorname{atan}\left(\frac{e_d}{e_q}\right) \tag{30}$$

Figure 7:
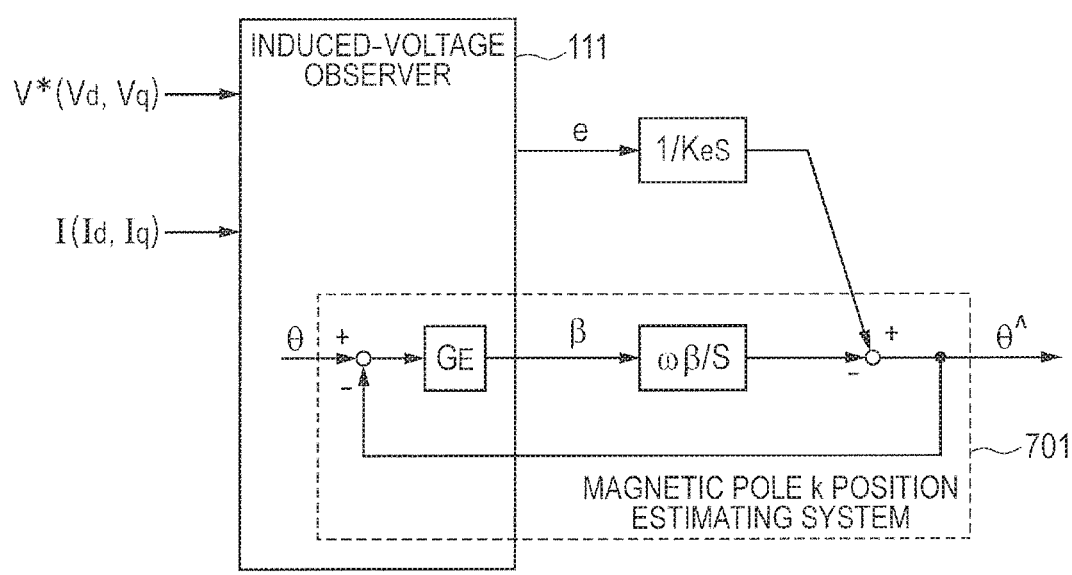
FIG. 7 is a diagram illustrating the details of an estimator in the control device of the first embodiment.

Next, from the calculated "e" and β, the magnetic pole position is estimated. FIG. 7 is a diagram illustrating the details of the estimator in the control device of the first embodiment. In FIG. 7, the function of estimating the induced voltage and the magnetic pole position in the control device of FIG. 2 is illustrated. In an induced-voltage estimation system 701, when an instruction voltage value and a detection current value are input, the phase error β and the magnitude "e" of the induced voltage are output. A magnetic pole position estimation value θA is controlled by adding phase information calculated from the amplitude "e", performing integration by multiplying the phase error β by an error angle integration gain ω_β so that β becomes equal to 0 (β=0).

A frequency characteristic $G_E$ of the induced-voltage estimation system becomes a stable secondary system determined by the natural frequency $\omega_{EG}$ and the damping factor $\zeta_{EG}$ when the estimation gains $K_{Ed1}$, $K_{Ed2}$, $K_{Eq1}$, and $K_{Eq2}$ are designed as formulae (31), (32), (33), and (34), respectively.

$$K_{Ed1} = 2\zeta_{EG}\omega_{EG} - \frac{R}{L_d} \tag{31}$$

$$K_{Ed2} = \omega_{EG}^2 L_d \tag{32}$$

$$K_{Eq1} = 2\zeta_{EG}\omega_{EG} - \frac{R}{L_q} \tag{33}$$

$$K_{Eq2} = \omega_{EG}^2 L_q \tag{34}$$

Therefore, the control gains which have to be designed in the induced voltage and magnetic pole position estimation system are the three control gains $\omega_{EG}$, $\zeta_{EG}$, and $\omega_\beta$.

2. Gain Designing Method 2-1. Design of Speed Control System and Current Control System Bandwidth $\omega_{SC}$ of the speed control system and bandwidth $\omega_{CC}$ of the current control system are designed to maintain the relation of the formula (35) so as not to interfere each other.

$$\omega_{CC} \gg \omega_{SC} \tag{35}$$

2-2. Design of Induced-Voltage Estimation System

As illustrated in FIGS. 5 and 6, since the frequency characteristic of the induced-voltage estimation system is a secondary system determined by $\omega_{EG}$ and $\zeta_{EG}$, $\omega_{EG}$ and $\zeta_{EG}$ are designed so that an induced-voltage estimation response becomes equal to or higher than a current response.

According to the above-described design concept, $\zeta_{EG}$ is fixed to a value of about 0.6 and $\omega_{EG}$ is designed so as to satisfy the relation of the following formula (36).

$$\omega_{EG} \geq \omega_{CC} \tag{36}$$

2-3. Design of Magnetic Pole Position Estimation System

It is sufficient to design the error angle integration gain $\omega_\beta$ in the magnetic pole position estimation system in FIG. 7 to a value sufficiently low relative to the bandwidth of the induced-voltage estimation system so that a phase margin can be sufficiently assured. However, when the error angle integration gain $\omega_\beta$ is set to be too low, the bandwidth of the speed control system is high and, in the case where the magnetic pole position estimation system receives a high-frequency input, a large phase lag may occur.

Since the phase lag is directly related to torque decrease, the lower limit of the error angle integration gain $\omega_\beta$ is determined according to allowance of the phase lag.

According to the above-described design concept, the error angle integration gain $\omega_\beta$ is designed. First, when the error angle integration gain $\omega_\beta$ is designed as the following formula (37), the frequency characteristic of the magnetic pole position estimation system becomes almost the same as the characteristic of a first-order lag system, so that the phase lags about 45° at the cutoff frequency $\omega_\beta$.

$$\omega_{EG} \gg \omega_\beta \tag{37}$$

That is, it can be considered that the upper limit of the input frequency of the magnetic pole position estimation system is determined by the bandwidth of the speed control system. Consequently, for example, when the bandwidth of the speed control system is designed to be equal to or less than the error angle integration gain $\omega_\beta$, an error is about 45° at the maximum. Using 45° as the allowable range of an error (torque decrease rate is about 30%), the relation between the bandwidth of the speed control system and the error angle integration gain is designed so as to always maintain the relation of the following formula (38).

$$\omega_\beta > \omega_{SC} \tag{38}$$

When the formulae (37) and (38) are combined, the following formula (39) is obtained.

$$\omega_{EG} \gg \omega_\beta \geq \omega_{SC} \tag{39}$$

When 2-1, 2-2, and 2-3 are combined, the relations of the gains of the control systems are expressed as the formula (40).

$$\omega_{EG} \geq \omega_{CC} \gg \omega_\beta \geq \omega_{SC} \tag{40}$$

That is, when motor parameters are known, design of the entire sensorless control system using the induced-voltage observer is only design of gains while maintaining the relations of the formula (40).

As described above, according to the control device of the first embodiment, by applying the induced-voltage observer to the induced-voltage estimation algorithm, the frequency characteristic of the induced-voltage estimation system can be clearly determined by the natural frequency $\omega_{EG}$. The bandwidth $\omega_{CC}$ of the current control system, the phase error integration gain $\omega_\beta$, and the bandwidth $\omega_{SC}$ of the speed control system are unconditionally determined according to the formula (40), gain adjustment is unnecessary, and stable control can be realized.

Second Embodiment

Generally, in sensorless control, at the time of low speed, low voltage cannot be correctly output due to voltage distortion caused by dead time necessary for inverter control. As a result, induced-voltage and the magnetic pole position cannot be accurately estimated.

In a second embodiment, negative feedback control is performed so that an output voltage of an inverter matches an instruction voltage without a lag. By decreasing the voltage distortion caused by the dead time, the precision of estimation of the induced voltage and the magnetic pole position is increased.

Figure 8:
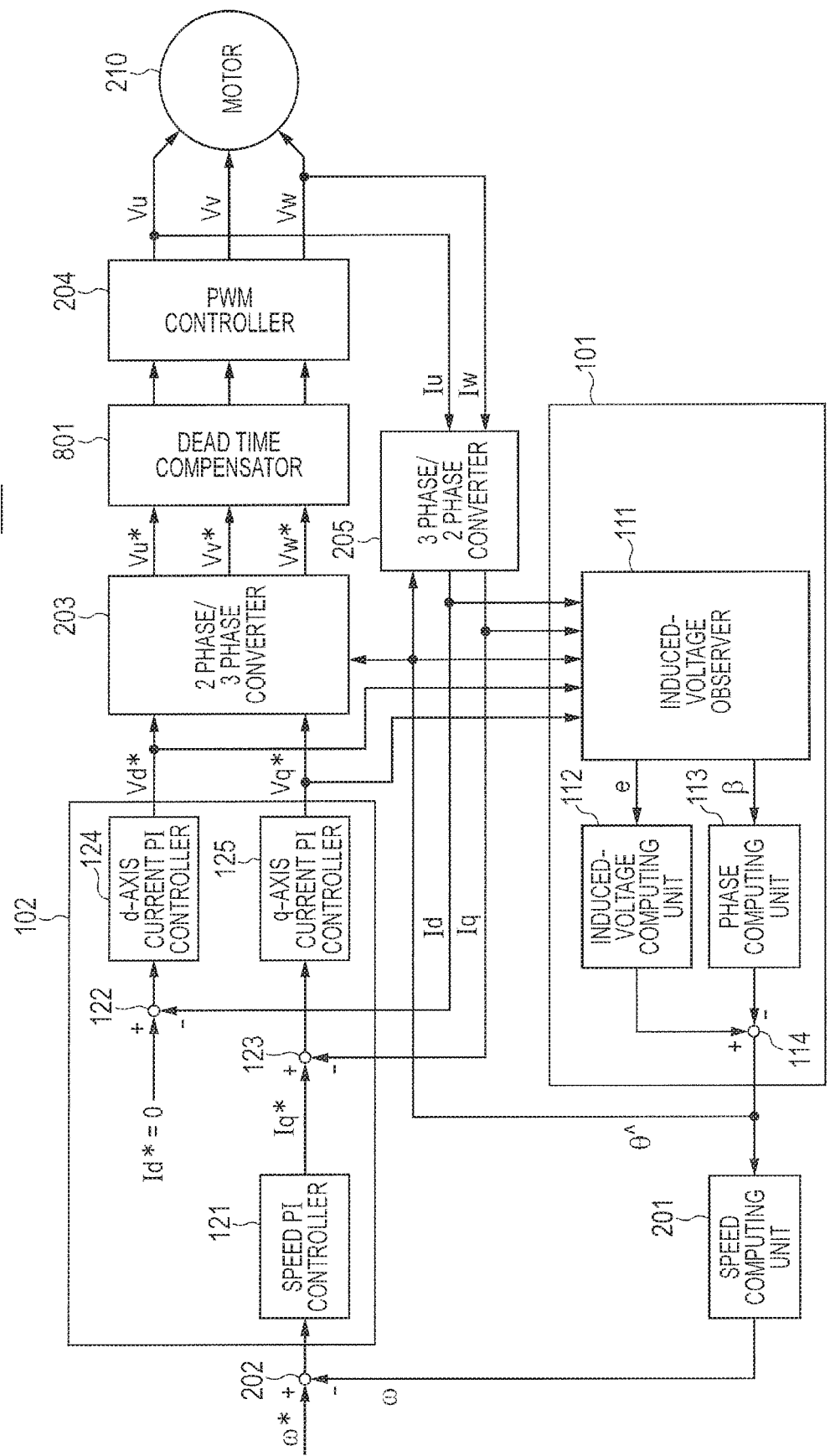
FIG. 8 is a block diagram illustrating the configuration of a control device according to a second embodiment.

FIG. 8 is a block diagram illustrating the configuration of a control device according to the second embodiment. In FIG. 8, the same numerals are designated to the same components as those in FIG. 2 and their description will not be repeated. In FIG. 8, a control device 800 has a dead time compensator 801.

The 2 phase/3 phase converter 203 converts the target voltages $V_d$ and $V_q$ instructed from the controller 102 to target voltages Vu*, Vv*, and Vw* of actual three phases. The 2 phase/3 phase converter 203 outputs the target voltages Vu*, Vv*, and Vw* of actual three phases to the dead time compensator 801.

The dead time compensator 801 performs negative feedback control so that the target voltages Vu*, Vv*, and Vw* of three phases output from the 2 phase/3 phase converter 203 match the instruction voltage without a lag. The detailed operation of the dead time compensator 801 will be described later. For example, the dead time compensator 801 may be constructed by an ASIC (Application Specific Integrated Circuit) or a processor or a semiconductor device made by a CPU (Central Processing Unit) and a memory.

The PWM controller 204 determines a duty ratio which realizes the target voltages of three phases output from the dead time compensator 801 by on/off of a not-illustrated DC power supply. The PWM controller 204 drives the motor 210 by a pulse wave of the duty ratio. For example, the PWM controller 204 has therein an inverter, and controls six switching elements to control voltages applied to three-phase coils in the motor 210.

Figure 9:
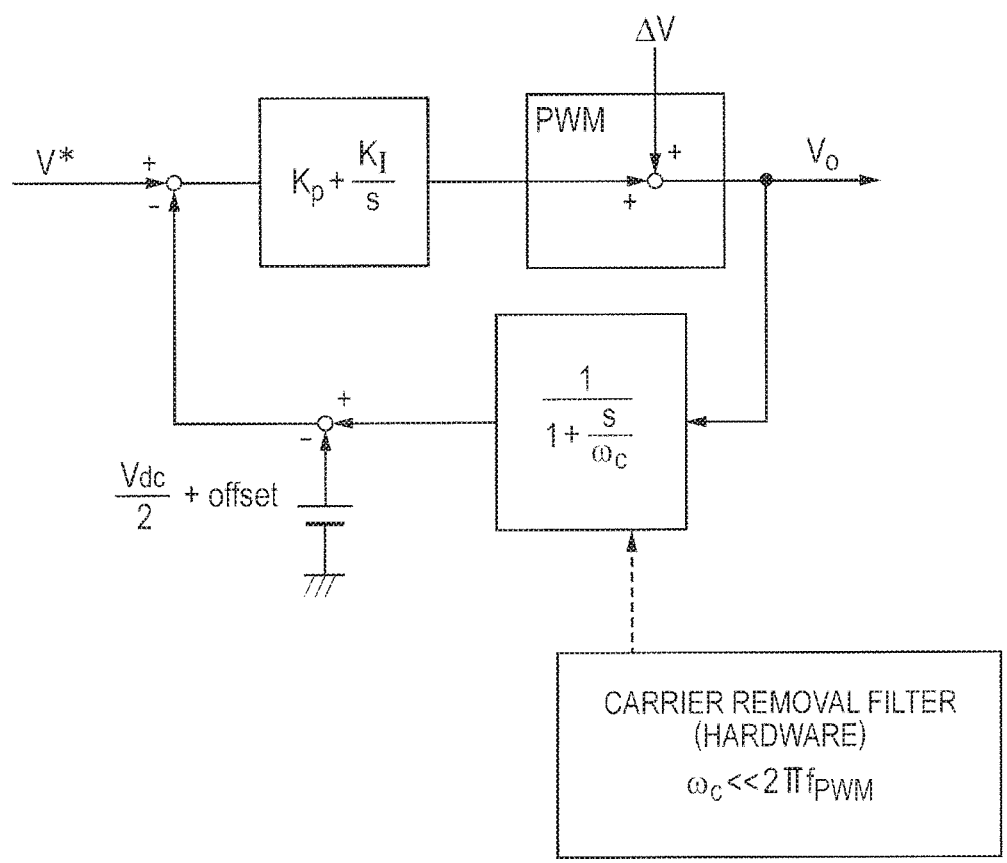
FIG. 9 is a block diagram of a voltage control system realizing dead time compensation control.

The detailed operation of the dead time compensator 801 will now be described. FIG. 9 is a block diagram of a voltage control system realizing dead time compensation control. The input/output characteristics of the voltage control system of FIG. 9 are expressed by the following formula (41).

$$\frac{V_o}{V^*} = \frac{K_P + \frac{K_I}{s}}{1 + \frac{K_P + \frac{K_I}{s}}{1 + \frac{s}{\omega_C}}} \quad (41)$$

In the formula (41), $K_P$ and $K_I$ are a proportional gain and an integration gain, respectively, in PI control. $\omega_C$ denotes cutoff frequency of a filter cutting frequencies below the frequency of a PWM.

When it is designed that $K_P=1$ and $K_I=\omega_C$, the formula (41) becomes the following formula (42).

$$\frac{V_o}{V^*} = \frac{1 + \frac{\omega_C}{s}}{1 + \frac{1 + \frac{\omega_C}{s}}{1 + \frac{s}{\omega_C}}} = 1 \quad (42)$$

That is, as expressed by the relation of the formula (42), an instruction voltage V* and an output voltage $V_O$ match without a lag. The dead time compensator 801 performs the control process of the formula (42).

As described above, according to the control device of the second embodiment, the voltage distortion caused by dead time can be decreased, so that the precision of estimating the induced voltage and the magnetic pole position increases, and the control can be performed at lower speed. In addition, since the voltage distortion caused by dead time can be decreased, the lower limit speed of magnetic pole position estimation can be lowered.

Third Embodiment

In a third embodiment, when the speed is below the lower limit speed of estimation of the induced voltage and the magnetic pole position, the mode is switched to a mode of performing a drive by passing d-axis current and forcedly changing the phase in accordance with a position instruction value (this mode will be called a pull-in operation mode).

Figure 10:
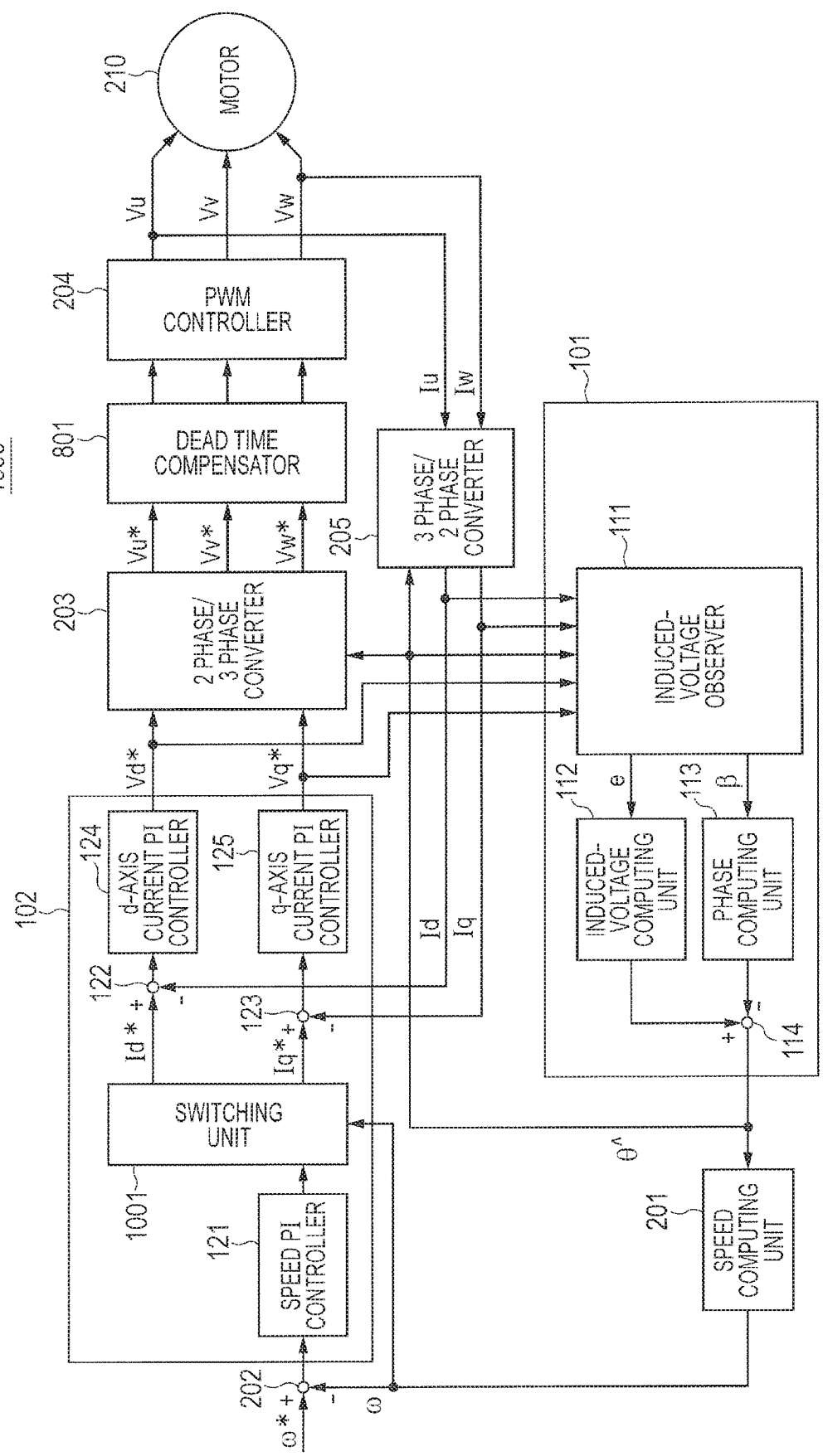
FIG. 10 is a block diagram illustrating the configuration of a control device according to a third embodiment.

FIG. 10 is a block diagram illustrating the configuration of a control device according to the third embodiment. In FIG. 10, the same numerals are designated to the same components in FIGS. 2 and 8 and their description will not be repeated. In FIG. 10, a control device 1000 has a switching unit 1001.

When rotation speed estimated by the speed computing unit 201 is larger than a predetermined threshold, the switching unit 1001 outputs $i_d^*=0$ to the d-axis current PI controller 124 and outputs $i_q^*$ output from the speed PI controller 121 to the q-axis current PI controller 125. When the rotation speed is equal to or less than the predetermined threshold, the switching unit 1001 outputs $i_d^*=i_{d\_ol}$ to the d-axis current PI controller 124 and outputs $i_q^*=0$ to the q-axis current PI controller 125. For example, the switching unit 1001 may be constructed by an ASIC (Application Specific Integrated Circuit) or a processor or a semiconductor device made by a CPU (Central Processing Unit) and a memory.

Figure 11:
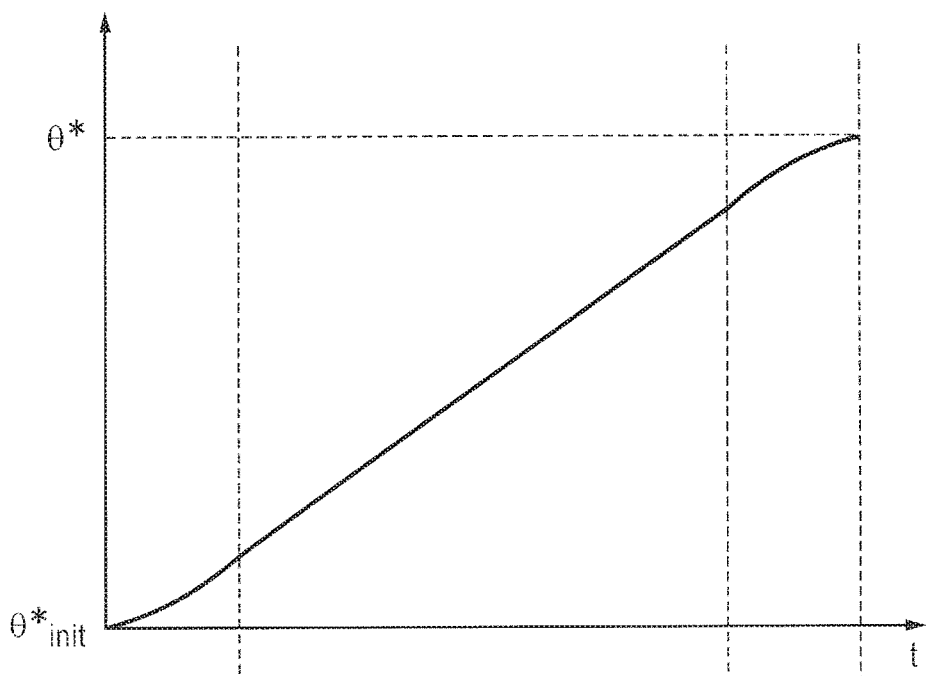
FIG. 11 is a graph illustrating an example of generation of a speed instruction value from a position instruction value.
Figure 11:
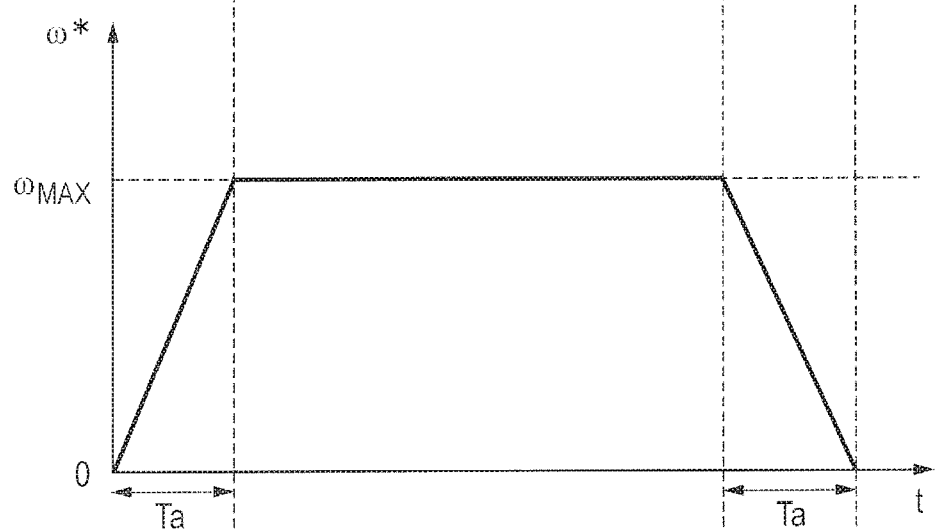

The operation of the control device 1000 will now be described. First, an operation of generating a speed instruction value from a position instruction value will be described. FIG. 11 is a graph illustrating an example of generation of a speed instruction value from a position instruction value. In FIG. 11, the horizontal axis indicates time, and the vertical axis indicates rotation angle (rotation position) and rotation speed. In FIG. 11, θ* indicates target position, Ta indicates acceleration time, $\omega_{MAX}$ indicates maximum speed, and ω* indicates a speed instruction value.

The speed instruction value is generated by differential of the position instruction value. The speed instruction value depends on an input parameter and becomes a trapezoid or triangle pattern. According to the speed instruction value, the motor is driven.

Next, the operation of the control device 1000 in the case where the motor rotates at low speed will be described.

Figure 12:
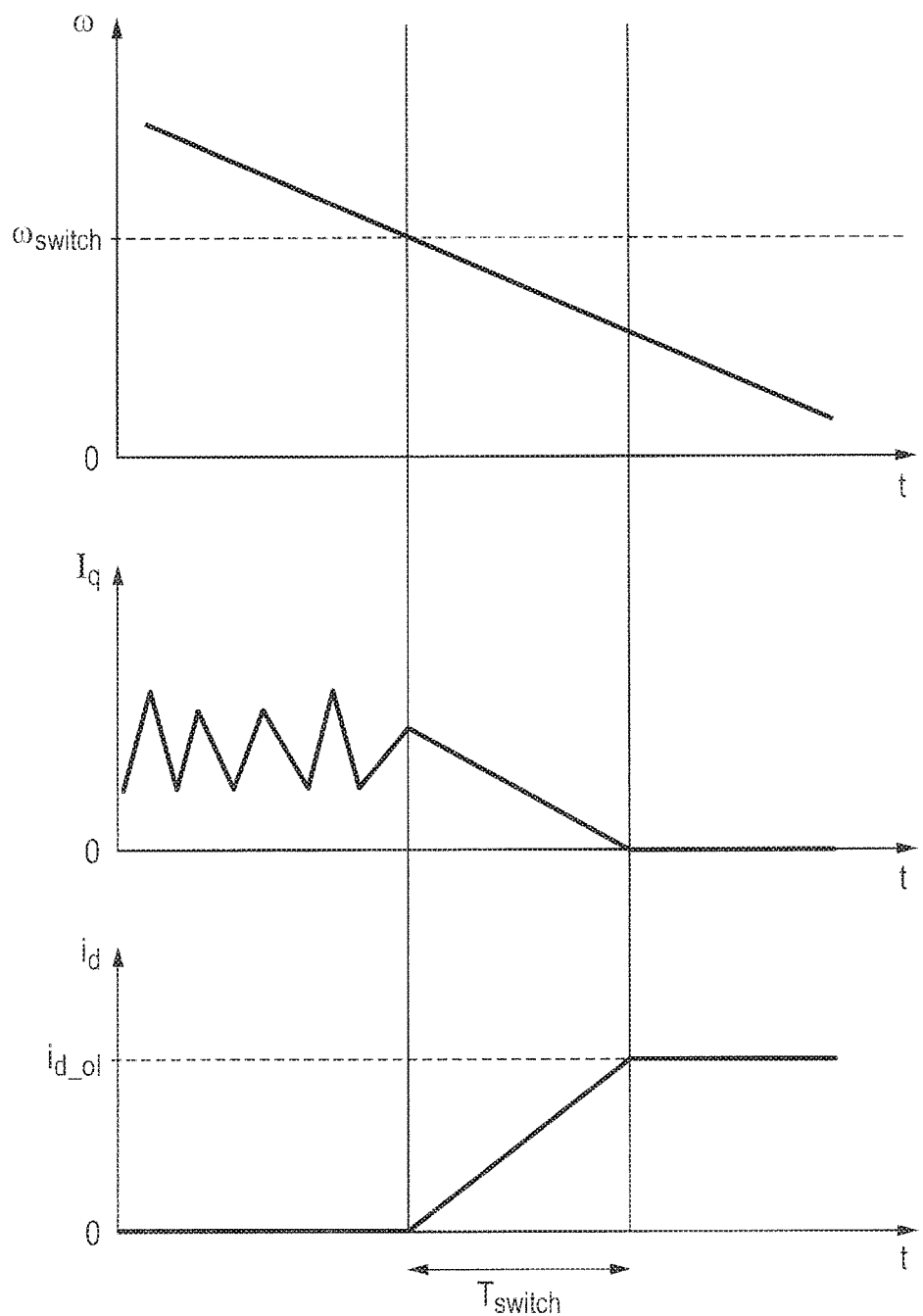
FIG. 12 is a graph illustrating an example of shift to a pull-in operation mode.

FIG. 12 is a graph illustrating an example of shift to a pull-in operation mode. In FIG. 12, the horizontal axis indicates time, and the vertical axis indicates rotation speed, q-axis current, and d-axis current. In FIG. 12, $\omega_{switch}$ denotes lower limit speed (speed of the threshold of shift to the pull-in operation mode). $i_{d\_ol}$ indicates d-axis current at the time of the pull-in operation. $T_{switch}$ indicates shift time to the pull-in operation.

As illustrated in FIG. 12, when the rotation speed is higher than the lower limit speed $\omega_{switch}$, $i_q^*$ output from the speed PI controller 121 is output to the q-axis current PI controller 125, and $i_d^*=0$ is output to the d-axis current PI controller 124 to control the motor. When the rotation speed becomes equal to or less than the lower limit speed $\omega_{switch}$, the d-axis current $i_{d\_ol}$ when $i_d^*$ is in the pull-in operation is output to the d-axis current PI controller 124 within the shift time $T_{switch}$ to the pull-in operation, and $i_q^*=0$ is output to the d-axis current PI controller 124 to control the motor. The d-axis current $i_{d\_ol}$ at the time of the pull-in operation is preferably set to q-axis current just before switching of the mode.

By the above operation, at the time of switch to the pull-in operation mode, the q-axis current just before switching of the mode is passed to the d-axis current PI controller 124, and the d-axis current and the q-axis current are replaced, thereby coupling the torques seamlessly.

Figure 13:
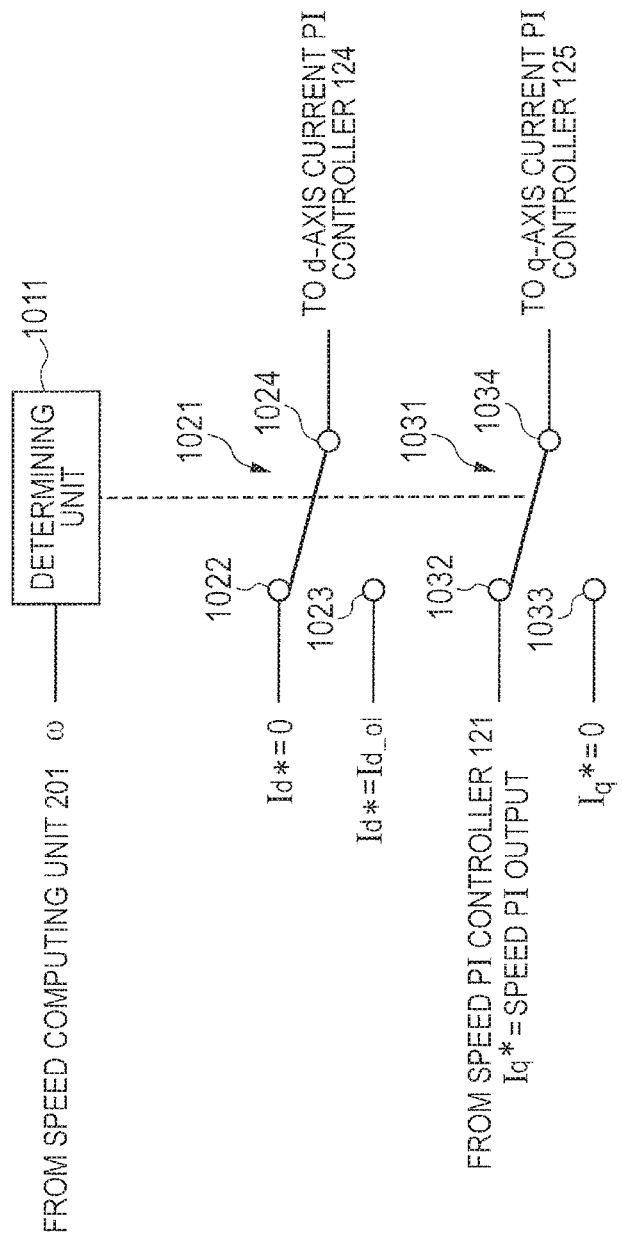
FIG. 13 is a circuit diagram illustrating the configuration of a switching unit in the control device of the third embodiment.

Next, the internal configuration of the switching unit 1001 will be described. FIG. 13 is a circuit diagram illustrating the configuration of the switching unit in the control device of the third embodiment. In FIG. 13, the switching unit 1001 has a determining unit 1011, a first switch 1021, and a second switch 1031.

The determining unit 1011 determines whether the rotation speed estimated by the speed computing unit 201 is larger than a predetermined threshold or is equal to or less than the predetermined threshold and outputs the determination result to the first switch 1021 and the second switch 1031.

According to the determination of the determining unit 1011, the first switch 1021 couples any of contact points 1022 and 1023 to a contact point 124. To the contact point 1024, the d-axis current PI controller 124 is coupled.

Concretely, when the rotation speed estimated by the speed computing unit 201 is larger than the predetermined threshold, the contact point 1022 is coupled to the contact point 1024. That is, $i_d^*=0$ is output to the d-axis current PI controller 124.

When the rotation speed estimated by the speed computing unit 201 is equal to or less than the predetermined threshold, the contact point 1023 is coupled to the contact point 1024. That is, $i_d^*=i_{d\_ol}$ is output to the d-axis current PI controller 124. $i_{d\_ol}$ is the d-axis current at the time of the pull-in operation.

According to the determination of the determining unit 1011, the second switch 1031 couples any of the contact points 1022 and 1033 to a contact point 1034. To the contact point 1032, the speed PI controller 121 is coupled. To the contact point 1034, the q-axis current PI controller 124 is coupled.

Concretely, when the rotation speed estimated by the speed computing unit 201 is larger than the predetermined threshold, the contact point 1032 is coupled to the contact point 1034. That is, $i_q^*$ output from the speed PI controller 121 is output to the q-axis current PI controller 125.

When the rotation speed estimated by the speed computing unit 201 is equal to or less than the predetermined threshold, the contact point 1033 is coupled to the contact point 1034. That is, $i_q^*=0$ is output to the q-axis current PI controller 125.

With the above configuration, in combination with the dead time compensating function realized by negative-feedback-controlling the voltage applied to the motor, drive is performed so as to follow the instruction speed generated from the position instruction profile.

As described above, according to the control device of the third embodiment, by seamlessly switching the speed control mode and the pull-in operation mode using the lower limit speed as a threshold, and performing driving on the basis of the instruction speed generated from the position instruction value, the simple positioning operation can be realized.

In the case where the state shifts from the state in which the speed exceeds the lower limit speed of estimation of the induced voltage and the magnetic pole position to the state in which the speed is below the lower limit speed of estimation of the induced voltage and the magnetic pole position, by passing the q-axis current just before the state shifts to the d-axis current PI controller 124 and replacing the d-axis current and the q-axis current, the torques can be seamlessly coupled and, in a state where the speed is below the lower limit speed, the positioning operation can be realized.

Concretely, when the speed is below the lower limit speed, by changing the mode to the pull-in operation mode and forcedly turning the phase in accordance with the position instruction profile, the simple positioning operation can be realized.

The above-descried program is stored by using any of non-transitory computer readable media of various types and can be supplied to a computer. The non-transitory computer readable media include tangible storage media of various types. Examples of the non-transitory computer readable media include magnetic recording media (for example, flexible disk, magnetic tape, and hard disk drive), magnet-optic recording media (for example, magnet-optic disk), CD-ROM (Read Only Memory), CD-R, CD-R/W, and semi-conductor memories (for example, mask ROM, PROM (Programmable ROM), EPROM (Erasable PROM), flash ROM, and RAM (Random Access Memory)). The program may be supplied to a computer by any of transitory computer readable media of various types. Examples of the transitory computer readable media include an electric signal, an optical signal, and electromagnetic wave. The transitory computer readable medium can supply a program to a computer via a wired communication path such as an electric wire or an optical fiber or a wireless communication path.

Although the present invention achieved by the inventors herein has been concretely described above on the basis of the embodiments, obviously, the present invention is not limited to the forgoing embodiments but can be variously changed without departing from the gist.

For example, although the example of controlling the three-phase brushless motor has been described in the foregoing embodiments, the invention can be also applied to a stepping motor of a PM (Permanent Magnet) type or an HB (Hybrid) type using a permanent magnet other than a three-phase motor.

What is claimed is:

1. A control device, comprising:
an estimator estimating an estimation induced voltage and a phase error of a motor by applying an induced-voltage observe circuit, and
a controller controlling the motor on the basis of the estimation induced voltage and the phase error,
wherein the estimator comprises the induced-voltage observe circuit, an induced-voltage computing circuit and a phase computing circuit,
wherein the induced-voltage computing circuit dividing the estimation induced voltage by an induced-voltage coefficient,
wherein the phase computing circuit performs integration by multiplying the phase error with an error angle integration gain,
wherein the estimator comprises a first subtractor,
wherein the first subtractor obtains a magnetic pole position estimation value by subtracting a computation result of the phase computing circuit from a computation result of the induced-voltage computing circuit.

2. The control device according to claim 1,
wherein the induced-voltage observe circuit estimates the estimation induced voltage and the phase error of the motor on the basis of the magnetic pole position estimation value of the motor fed back from the first subtractor, a target voltage, and a response current.

3. The control device according to claim 2, further comprising:
a speed computing circuit calculating a rotation speed from the magnetic pole position estimation value; and
a second subtractor subtracting the rotation speed calculated by the speed computing circuit from a target rotation speed,
wherein the controller controls the motor on the basis of a subtraction result of the second subtractor.

4. The control device according to claim 2, further comprising:
a PWM controller having an inverter and driving the motor by a pulse wave of a duty ratio on the basis of the target voltage, and
a dead time compensator performing a negative feedback control on the PWM controller on the target voltage so that an output voltage of the inverter matches an instruction voltage without a lag.

5. The control device according to claim 3,
wherein the controller comprises:
a speed PI controller determining a current target value determined from a difference between the target rotation speed and the rotation speed calculated by the speed computing circuit;
a switching unit that:
when the rotation speed calculated by the speed computing circuit is larger than a predetermined threshold, sets a d-axis target current to zero and setting a q-axis target current to the current target value determined from a difference between the target rotation speed and the rotation speed obtained by the speed computing circuit; and
when the rotation speed calculated by the speed computing circuit is equal to or less than the predetermined threshold, sets a predetermined d-axis current at a time of a pull-in operation and setting a q-axis target current to zero;
a d-axis current PI controller determining a d-axis target voltage from a difference between a d-axis target value and a d-axis current value; and
a q-axis current PI controller determining a q-axis target voltage from a difference between a q-axis target value and a q-axis current value.

6. The control device according to claim 3,
wherein a predetermined d-axis current at the time of the pull-in operation is a q-axis current value when the rotation speed calculated by the speed computing circuit becomes equal to or less than a predetermined threshold.

* * * * *